United States Patent [19]

Erickson

[11] Patent Number: 4,801,393
[45] Date of Patent: Jan. 31, 1989

[54] HIGH-TEMPERATURE NON-OXIDIZING WATER VAPOR ABSORBENT

[76] Inventor: Donald C. Erickson, 1704 S. Harbor La., Annapolis, Md. 21401

[21] Appl. No.: 64,809

[22] Filed: Jun. 19, 1987

[51] Int. Cl.$^4$ ................................................ C09K 5/04
[52] U.S. Cl. ........................................ 252/69; 62/109; 62/112; 165/3; 252/194
[58] Field of Search ...................... 62/109, 112; 165/3; 252/69, 194

[56] References Cited

U.S. PATENT DOCUMENTS

| | | | |
|---|---|---|---|
| 1,738,270 | 12/1929 | Zellhoefer | 62/112 |
| 3,458,445 | 7/1969 | Macriss et al. | 252/69 |
| 3,541,013 | 11/1970 | Macriss et al. | 252/69 |

FOREIGN PATENT DOCUMENTS

| | | | |
|---|---|---|---|
| 3131487 | 2/1983 | Fed. Rep. of Germany | 252/69 |
| 3242701 | 5/1984 | Fed. Rep. of Germany | 252/69 |

OTHER PUBLICATIONS

Prikhod'ko et al., "Study of Adsorption of Organic Substances in a Thiocyanak Melt by Impedance," Ukr. Khim. Zh. (Russ. Ed.) 1981, 47(4), 447–8.

Primary Examiner—Robert A. Wax

[57] ABSTRACT

A new absorbent for water vapor is disclosed which is non-oxidizing and is suitable for use as the absorption working pair in combination with $H_2O$ in absorption heat pumps, and also as a liquid drying agent. The absorbent is comprised of a mixture of at least two alkali metal thiocyanates, preferably KCNS and NaCNS. The preferred weight ratio is between 3 and 4, which remains liquid at all water vapor pressures above 1/16 ATA (curve "30 Na" on the Figure). Further advantages are obtainable by incorporating at least one of lithium cations, cesium cations, and hydroxide anions in the absorbent mixture.

10 Claims, 1 Drawing Sheet

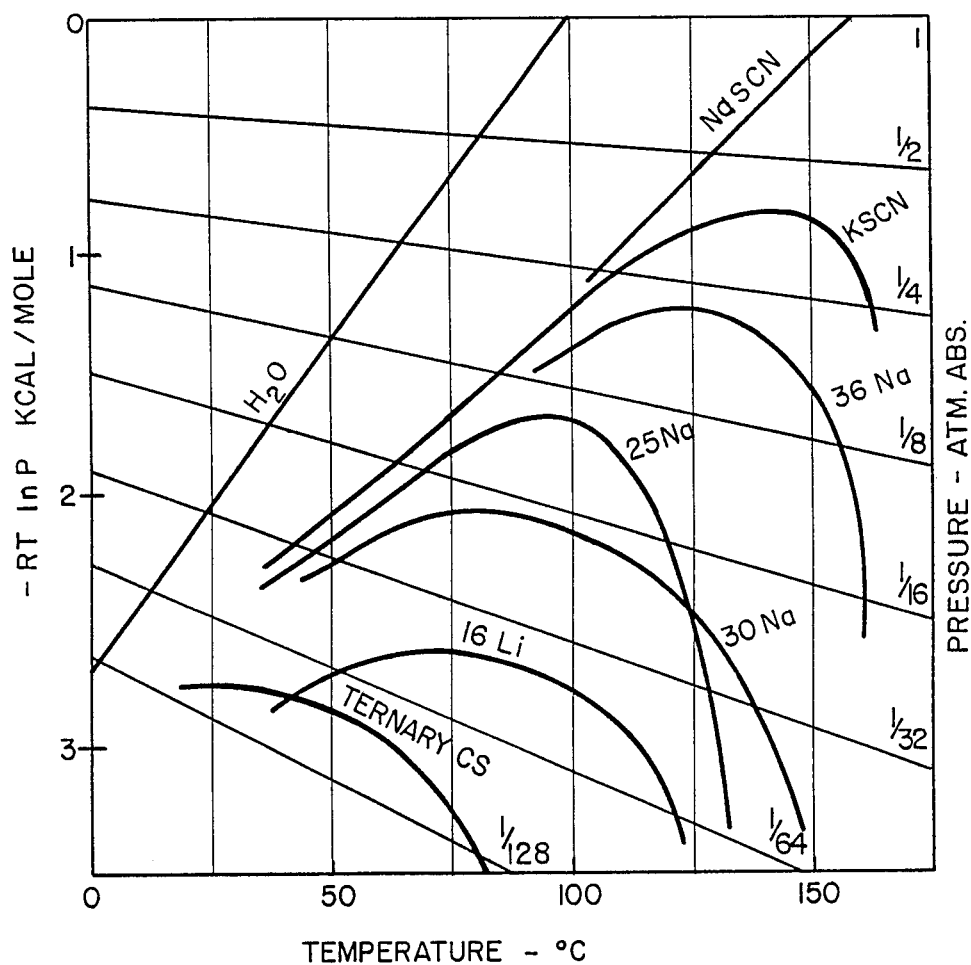

HIGH-TEMPERATURE NON-OXIDIZING WATER VAPOR ABSORBENT

DESCRIPTION

TECHNICAL FIELD

This invention relates to liquid absorbent compositions which absorb useful quantities of water vapor at high boiling-point elevations, and which are useful in absorption cycle devices such as absorption heat pumps, solution compressors, and gas dryers. The disclosed solution and the cycles which employ it provide the combined advantages of higher solubility limit at low temperatures, high-temperature stability, non-oxidizing character, and compatibility with common construction materials such as austenitic stainless steel.

BACKGROUND ART

There has long been an identified need for an absorbent for water vapor which overcomes the various problems of the currently used absorbents, most particularly LiBr. Aqueous LiBr solutions suffer two primary limitations when used as a water vapor absorbent. The solubility field (i.e., the maximum boiling point elevation) is quite limited at lower temperatures, and the corrosivity is quite severe at higher temperatures (e.g., above 160° C.). Also it is not compatible with austenitic stainless steel at high temperatures.

Many additives to LiBr have been tested for possible amelioration of the above limitations. These include $CaCl_2$ (U.S. Pat. No. 2,143,008), CsBr (U.S. Pat. No. 3,004,919), LiSCN (U.S. Pat. No. 3,541,013), LiI (U.S. Pat. No. 3,524,815), $ZnBr_2$ (U.S. Pat. No. 3,478,530) and ethylene glycol. Much of the earlier work is summarized in the 1978 technical report, "Candidate Chemical Systems for Air Cooled, Solar Powered, Absorption Air Conditioner Design," by W.J. Biermann (SAN-1587-2, 1978), published by the U.S. Department of Energy, Washington, D.C.

In overall summary, although some of the additives do improve one parameter, it is invariably at the expense of a degradation in some other important parameter (viscosity, thermal stability, etc.) such that no net benefit is realized. Hence the only additives routinely used in LiBr solutions are trace amounts of corrosion inhibitor (e.g., LiOH plug chromate or molybdate) and trace amounts of mass transfer enhancer (e.g., octyl alcohol), and the historic limitations of LiBr solutions persist.

No other single salt is known to evidence as wide as low temperature solubility field as LiBr. Recently, however, certain mixtures of non-halide salts have been discovered to exhibit useful new capabilities as water vapor absorbents. Both the binary NaOH-KOH and the ternary NaOH-KOH-CsOH have been found to greatly extend the low temperature solubility limit (U.S. Pat. No. 4,614,605). However, those mixtures have the disadvantages of being caustic, moderately corrosive, and reactive with atmospheric $CO_2$.

A second advantageous mixture is the family of alkali nitrates (U.S. Pats. Nos. 4,454,724, 4,563,295, and 4,652,279). These mixtures are thermally stable to well above 260° C., and virtually non-corrosive to many materials of construction including mild steel. However, they have the drawbacks of having a severly limited low temperature solubility field, and also their potentially oxidizing nature. This causes concern when the absorbent is in heat exchange relationship with a fuel species, as a leak in the heat exchanger would allow the fuel and oxidizer to mix which could result in uncontrolled combustion.

Another problem with existing non-volatile liquid-phase water absorbents, including all of the halide, hydroxide, and nitrate mixtures referenced above, is that their anhydrous melting point is too high, typically well above 100° C. When it is desired to dry a gas such as ammonia synthesis gas or hydrocarbons to a "bone-dry" condition, it is necessary to contact the gas with a virtually anhydrous absorbent. The lower the contact temperature, the more $H_2O$ the absorbent can absorb, and the lower the regeneration temperature, along with other advantages. Hence it would also be desirable to have a non-oxidizing liquid absorbent of water vapor with an anhydrous melting point of below 100° C.

What is needed, and one objective of the presently disclosed invention, is a new water vapor absorbent which avoids the limitations enumerated above of the halide-containing systems, the hydroxide mixtures, and the nitrate mixtures. More particularly an absorbent is desired which is non-oxidizing, and which has at least as extensive a solubility field as the nitrates. It would be preferable if it could be used at even lower water vapor pressures than the nitrates, and also at comparably high temperatures as the nitrates.

SUMMARY OF INVENTION

The above and other desirable objectives are obtained by providing as the water vapor absorbent solution a mixture comprised of potassium and sodium thiocyanates.

The liquid absorbent is normally utilized as an aqueous solution comprised of between about 2 and 60 weight percent $H_2O$. However, due to the low anhydrous melting point of the mixture, the absorbent can be regenerated to virtually anhydrous condition, thereby making possible the drying of gases to a "bone-dry" condition. When "bone-dry" drying is desired, it is preferred to use a low melting point absorbent, and hence, the absorbent mixture would preferably also be comprised of LiSCN and/or CsSCN, since they further reduce the anhydrous melting point below the 122° C. eutectic of the potassium-sodium-thiocyanate mixture.

Another use of the new absorbent is in an absorption cycle apparatus, as described in the prior art references, wherein the reversible absorption and desorption of water vapor is used to effect a transfer of heat from lower to higher temperature. In one scenario, characteristic of industrial use, low grade heat at a temperature in the approximate range of 30° C. to 150° C. is upgraded to a higher temperature, preferably from 30° to 90° C. higher than the input temperature. This may be via either forward cycle absorption heat pumps ("heat amplifiers"), reverse cycle AHPs ("heat transformer" or "temperature amplifier"), or any known types of advanced cycles—multieffect or staged, generator to absorber heat exchanger, etc. Examples of advanced cycles are presented in the 1984 technical article "Analyses of Advanced Residential Absorption Heat Pump Cycles" by B.A. Phillips, appearing in the U.S. Department of Energy publication CONF-841231. When the absorbent mixture is limited to potassium and sodium thiocyanates, the thermal stability is excellent, extending to above 200° C. If the preferred proportions of about 70 weight percent KSCN and 30 weight percent NaSCN (anhydrous basis) is used, then water vapor pressures as low as 0.1 atmospheres can be present in either the generator or the absorber without possibility of solution crystallization.

By adding either LiSCN or CsSCN to the mixture, even lower water vapor pressures are possible, e.g., 0.01 (ATA) (corresponding to an evaporator or condenser at about 7° C.). However, there are certain offsetting disadvantages—the LiSCN is not thermally stable at high temperatures (above about 150° C.), and the CsSCN is quite expensive ($60/kg) and increases the required solution circulation rate. Hence, the LISCN and/or CsSCN additives would only be expected to be used when either low water vapor pressures are present or when a low anhydrous melting point is desired. Typical examples of heat pumping applications involving low water vapor pressures are space conditioning (heating or air conditioning) and hot water heating. The virtually unlimited solubility field of mixtures containing LiSCN and/or CsSCN make possible air-cooled air conditioning and also high-temperature high-COP generator absorber heat exchanger (GAX) cycles (CsSCN only).

BRIEF DESCRIPTION OF THE DRAWING

The FIGURE illustrates the vapor-liquid-solid equilibrium (VLE) characteristics of aqueous solutions of various pure alkali thiocyanates and their mixtures, on coordinates of RTlnP (kcal/mole) versus T(°C.), with constant pressure contours indicated.

BEST MODE FOR CARRYING OUT THE INVENTION

Referring to the FIGURE, a series of experiments were conducted which entailed boiling steam out of various alkali metal thiocyanate salt solutions (pures and mixtures) at atmospheric pressure, plus cooling the salts at constant concentration from various boiling points until crystallization was observed. With that data, plus an estimate of the slope of constant concentration VLE lines, it was possible to construct approximate crystallization curves. Several curves from mixtures of interest are drawn on the figure. The slope of constant concentration VLE, which is approximately the $\Delta S°$ of evaporation (change in standard state entropy between liquid and vapor phase), can be estimated from literature values for pure salts or by analogy to similar salts having similar heats of solution. Trouton's Rule reveals that most liquids have a slope of approximately 22 cal/-mole-K. For most mixtures an anhydrous melting point was also obtained, which provides a vertical asymptote to each curve.

Because of the above estimation technique, the crystallization curves are somewhat approximate, but nonetheless adequate to provide a good overall indication of the range of characteristics possible with the newly defined salt mixtures as water vapor absorbents.

The water dissolving properties of the alkali metal thiocyanates have been found to be qualitatively similar to those of the alkali metal nitrates. The lithium cation provides the best boiling point elevations and generally best solubility limits, but is by far the least thermally stable. The thiocyanates of the other alkali metal cations are highly stable, but much less soluble in $H_2O$ and with substantially reduced boiling point elevations (at a given concentration).

As with the nitrates, none of the pure thiocyanates is an acceptable water vapor absorbent, for the above reasons. However, just about all mixtures of two or more alkali metal thiocyanates which contain no more than about 85 weight percent (w/o) of any single thiocyanate species (anhydrous basis) have been found to be potentially useful as a water vapor absorbent. Even more surprising, a mixture which is limited to only potassium and sodium thiocyanate has been found to be as good as or better than the best possible ternary mixture of $LiNO_3$, $NaNO_3$, and $KNO_3$ as a water vapor absorbent. Most importantly, the binary thiocyanate mixture is non-oxidizing, and hence can safely be used with fuel species such as hydrocarbons.

FIG. 1 illustrates the solubility fields of several alkali metal thiocyanates and their mixtures. Pure NaSCN and KSCN have very narrow solubility fields until excessively high water vapor pressures are reached (0.5 ATA for KSCN and much higher for NaSCN). However, over the range of 20 to 35 w/o NaSCN in KSCN (anhydrous basis) much lower water vapor pressures are possible without crystallization: ⅛ ATA at 25 w/o NaSCN, 1/16 ATA at 30 w/o NaSCN, and ¼ ATA at 36 w/o NaSCN. Note that the minimum possible water vapor pressure to prevent freezeup for the K-Na binary is found in that range of concentration, at roughly 30 w/o NaCNS.

If even lower mimimum water vapor pressures or lower anhydrous melting points are required, they can be achieved by addition of CsSCN, LiSCN, or both. The figure shows an example effect of each type of addition, one curve for 16 w/o LiSCN, 58 w/o KSCN, and 26 w/o NaSCN. and the other for ternary equimolar K-Na-Cs thiocyanate. Other mixtures with even more LiSCN evidence even lower minimum water vapor pressures, on the order of 0.01 ATA or less. Also, certain quaternary mixtures have lower anhydrous melting points than the 88° C. of the equimolar ternary.

It is within the scope of this invention to include trace amounts of hydroxide anion in the thiocyanate mixture for pH control in order to reduce corrosion. It is also within the scope to incorporate very substantial amounts of hydroxide anion (e.g., up to 50%), thereby further improving the low temperature solubility field. This is particularly advantageous with only potassium and sodium cations, since the increased solubility field is obtained without either the low thermal stability of LiSCN or the high cost of CsSCN. Other additives may also be present in the thiocyanate mixture, such as mass transfer enhancers, corrosion inhibitors, or freezing point depressants. However, nitrates and other strong oxidizers are not recommended for safety reasons.

The essential components of the absorption cycle apparatus in which this new absorbent is used to absorb water vapor are a generator, an absorber, and an absorbent solution circulation pump. These components form what is commonly referred to as a "solution compressor". Normally there would also be present either a solution heat exchanger or a generator-to-absorber heat exchanger (GAX cycle). Closed absorption cycles also incorporate an evaporator and condenser in addition to the solution compressor. However, the absorption heat pump may also be open cycle, in which case either or both of the evaporator and condenser can be eliminated. When both are deleted, the solution compressor is in essence a thermally-powered steam compressor. In "forward" cycles, the generator water vapor pressure is higher than that of the absorber, whereas the reverse cycles the pressures are reversed.

I claim:

1. A process for transferring heat from low to high temperature comprising evaporating water at said low temperature, absorbing the resulting water vapor into an aqueous solution at said high temperature, and providing as said aqueous solution a composition of matter comprised of at least 2 weight percent H$_2$O, KSCN and NaSCN.

2. Process according to claim 1 wherein said high temperature is above 170° C.

3. Process according to claim 1 further comprising regenerating said aqueous solution for additional absorption by desorbing water vapor from it at a pressure which is different by at least a factor of 1.3 from the pressure of said absorbing step.

4. The process of claim 1 wherein the composition comprises between about 2 and 70 weight percent water.

5. The process of claim 1 wherein the weight ratio of KSCN to NaSCN is between about 4 and 1.

6. The process of claim 5 wherein the weight ratio of KSCN to NaSCN is about 2.5.

7. The process of claim 1 wherein the composition further comprises CsSCN or LiSCN or a mixture thereof.

8. The process of claim 1 wherein the composition consists essentially of 40 to 80 weight percent KSCN and at least 10 weight percent NaSCN.

9. The process of claim 1 wherein the composition consists essentially of 30 to 70 weight percent KSCN, 10 to 50 weight percent NaSCN and at least 5 weight percent CsSCN.

10. The process of claim 1 wherein the composition further comprises hydroxide ions.

* * * * *